US007663072B2

(12) United States Patent
Conard et al.

(10) Patent No.: US 7,663,072 B2

(45) Date of Patent: Feb. 16, 2010

(54) DELIVERY POINT SORTING SYSTEM

(75) Inventors: Walter S. Conard, Lake Villa, IL (US); Rich Wojdyla, Wadsworth, IL (US); Steve Archer, Des Plaines, IL (US); Brian Bowers, Mundelein, IL (US); John Overman, Evanston, IL (US)

(73) Assignee: Bowe Bell & Howell Company, Lincolnwood, IL (US)

( * ) Notice: Subject to any disclaimer, the term of this patent is extended or adjusted under 35 U.S.C. 154(b) by 35 days.

(21) Appl. No.: 10/425,769

(22) Filed: Apr. 29, 2003

(65) Prior Publication Data

US 2009/0014364 A1 Jan. 15, 2009

(51) Int. Cl.

| | |
|---|---|
| ***B07C 5/00*** | (2006.01) |
| ***G06K 9/00*** | (2006.01) |
| ***G06F 7/00*** | (2006.01) |

(52) U.S. Cl. ...................... 209/584; 209/900; 700/219; 700/223

(58) Field of Classification Search ................ 209/509, 209/608, 552, 576, 587, 584, 583, 597, 900; 700/219, 221, 223, 224, 225

See application file for complete search history.

(56) References Cited

U.S. PATENT DOCUMENTS

| | | | | |
|---|---|---|---|---|
| 3,573,748 | A * | 4/1971 | Holme | 209/584 |
| 5,277,321 | A * | 1/1994 | Nagasawa et al. | 209/583 |
| 5,385,243 | A * | 1/1995 | Jackson et al. | 209/509 |
| 6,303,889 | B1 * | 10/2001 | Hayduchok et al. | 209/584 |
| 6,953,906 | B2 * | 10/2005 | Burns et al. | 209/584 |
| 7,282,658 | B2 * | 10/2007 | Hanson et al. | 209/584 |
| 2001/0030147 | A1 * | 10/2001 | Tamamoto et al. | 209/547 |
| 2002/0125177 | A1 * | 9/2002 | Burns et al. | 209/630 |

* cited by examiner

*Primary Examiner*—Patrick H Mackey
*Assistant Examiner*—Mark Hageman
(74) *Attorney, Agent, or Firm*—McDermott Will & Emery LLP

(57) ABSTRACT

A delivery point packaging system and method of preparing and sorting mail pieces sorts, packages and assembles mail pieces into a predetermined delivery point order.

19 Claims, 8 Drawing Sheets

DELIVERY POINT SORTING SYSTEM

TECHNICAL FIELD

The present subject matter relates to a delivery point sorting system and method of preparing and sorting mail pieces. More specifically, the system processes and sorts mail pieces such that mail pieces can be sorted and assembled into predetermined delivery point orders.

BACKGROUND

It is desirable for mail pieces to be sorted as efficiently and specifically as possible so that time and costs associated with manual sorting can be reduced. A need exists, therefore, for a system that can be used by a large mail processing center, such as a U.S. Postal Service processing and distribution center ("P&DC"), which sorts several types of mail pieces, e.g., letters, flats, etc., that it receives from several different sources, e.g., collection mail pieces from carriers, pre-sorted bulk mail pieces from bulk mailers or mail pieces from other P&DC's. A U.S. Postal Service P&DC, for example, may want to be able to process, sort and package mail pieces for delivery to a local associate post office such that the mail pieces are sorted and packaged in a predetermined order such as a carrier route sequence or delivery point sequence.

SUMMARY

The present subject matter relates to a system that is expandable, so that it can sort large or small quantities of mail pieces and can assemble the mail pieces in carrier route order or delivery point order in a single pass.

An objective is to help save costs and save time associated with the manual sorting of mail pieces.

Additional objects, advantages and novel features of the examples will be set forth in part in the description which follows, and in part will become apparent to those skilled in the art upon examination of the following and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

Figure 1:
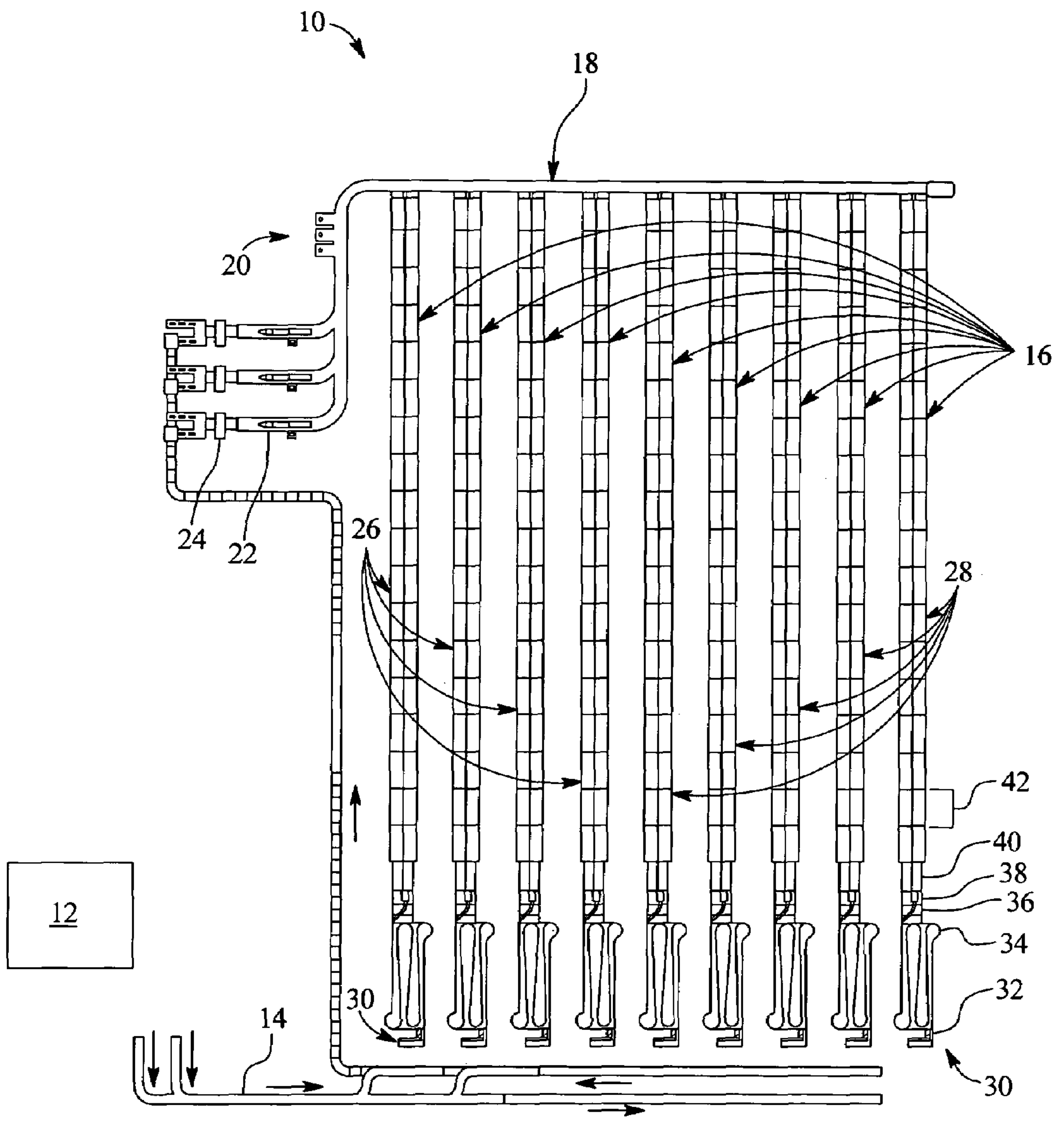
FIG. 1 illustrates a schematic diagram of an example of a delivery point sorting system.

Referring now to FIG. 1, one example of a delivery point sorting system 10 is shown. Mail pieces, e.g., envelopes, flats, etc., are brought to the system 10 from a staging area 12. The mail pieces can be delivered to the system 10 from the staging area 12 via trays on a supply conveyor 14. The system 10 includes a number of processing lines 16, main delivery point transport conveyors 18, residual mail feeders 20, automatic packaging systems 22 and traying systems 24.

As shown in FIG. 1, the system generally has two types of processing lines, letter processing lines 26 and flats processing lines 28. In the example shown in FIG. 1, the system has four letter processing lines 26 and five flats processing lines 28. Each of the processing lines 16, i.e., letter processing lines 26 and/or flats processing lines 28, include one or more of the following general subsystems: feeder module 30, image lift module 32, delay module 34, diverter module 36, laydown module 38, elevator module 40, and one or more bin modules 42.

The feeder modules 30 can be letter feeders or flats feeders, as required for the type of processing line with which it is associated. Similarly, the delay modules 34 can be letter delay modules of flats delay modules as required.

Each processing line 16 can be dual sided and can have one or more levels. As shown the system 10 is dual sided and has three levels, Level One 46, Level Two 48 and Level Three 50 (See FIG. 3) for a total of six rows of bin modules 42 per line. The bin modules 42 may be ones that are manufactured and sold by a company called Romec Limited (UK) and known as automated walk sequencing machines. Each bin module 42 has a number of bins 43, each of which holds a single mail piece and has a diverter gate 44 (FIG. 2) at one end that opens to divert mail from a mail piece transport 54 into the diverter bin 43. In addition, each bin 43 has another gate (not shown) at the other end that opens to allow the mail piece to drop from the bin 43 onto a processing line delivery point conveyor 52.

Figures 2A, 2B, 2C:
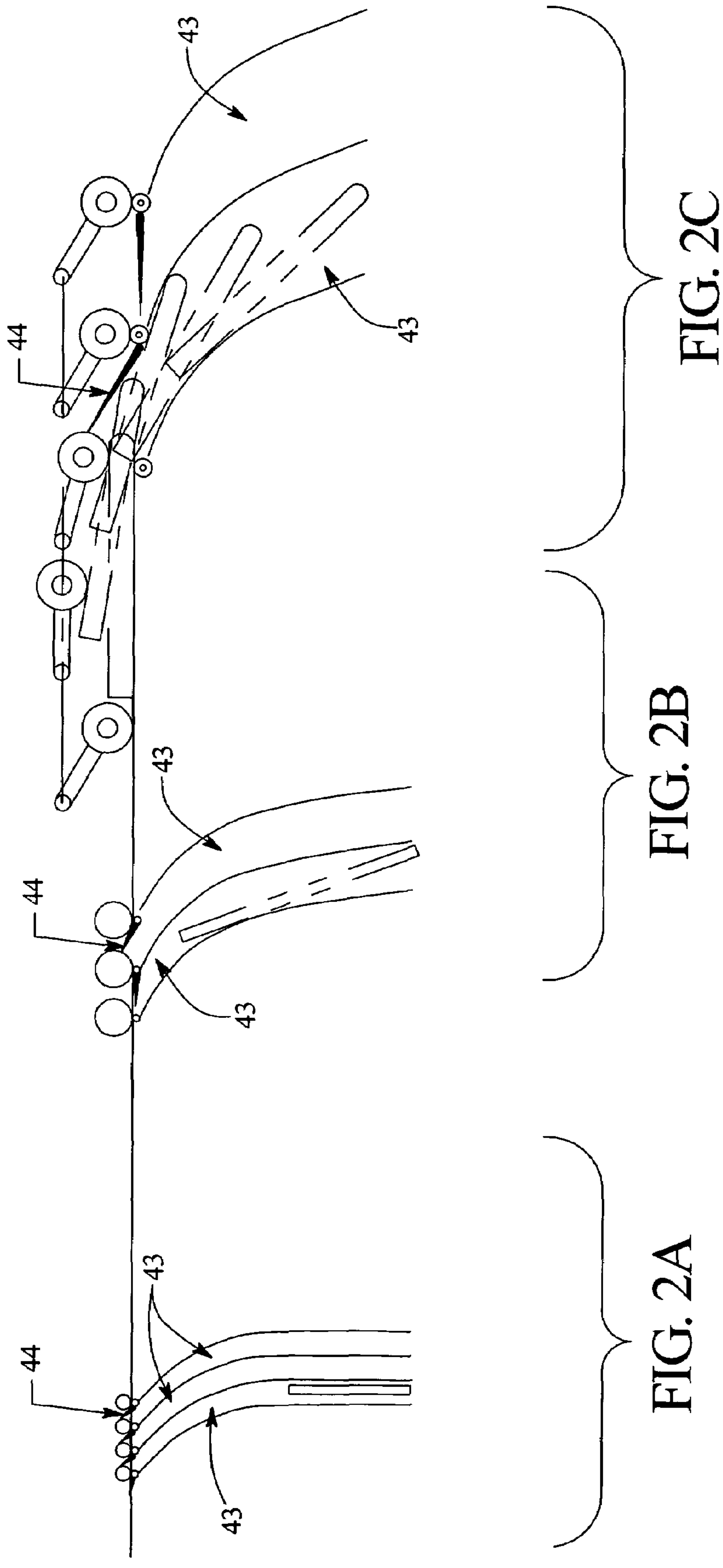
FIG. 2 illustrates a schematic diagram of bins used in the system shown in FIG. 1.

The bins 43 may have various widths to accommodate different types of mail pieces. For example, as shown in FIG. 2, the bins 43 shown in FIG. 2*a* may be approximately 1.125 inches wide to accommodate letter size mail pieces, the bins 43 shown in FIG. 2*b* may be approximately 2.25 inches wide to accommodate flats and the bins 43 shown in FIG. 2*c* may be 5.5 inches wide to accommodate larger and thicker flat mail pieces.

Figure 3:
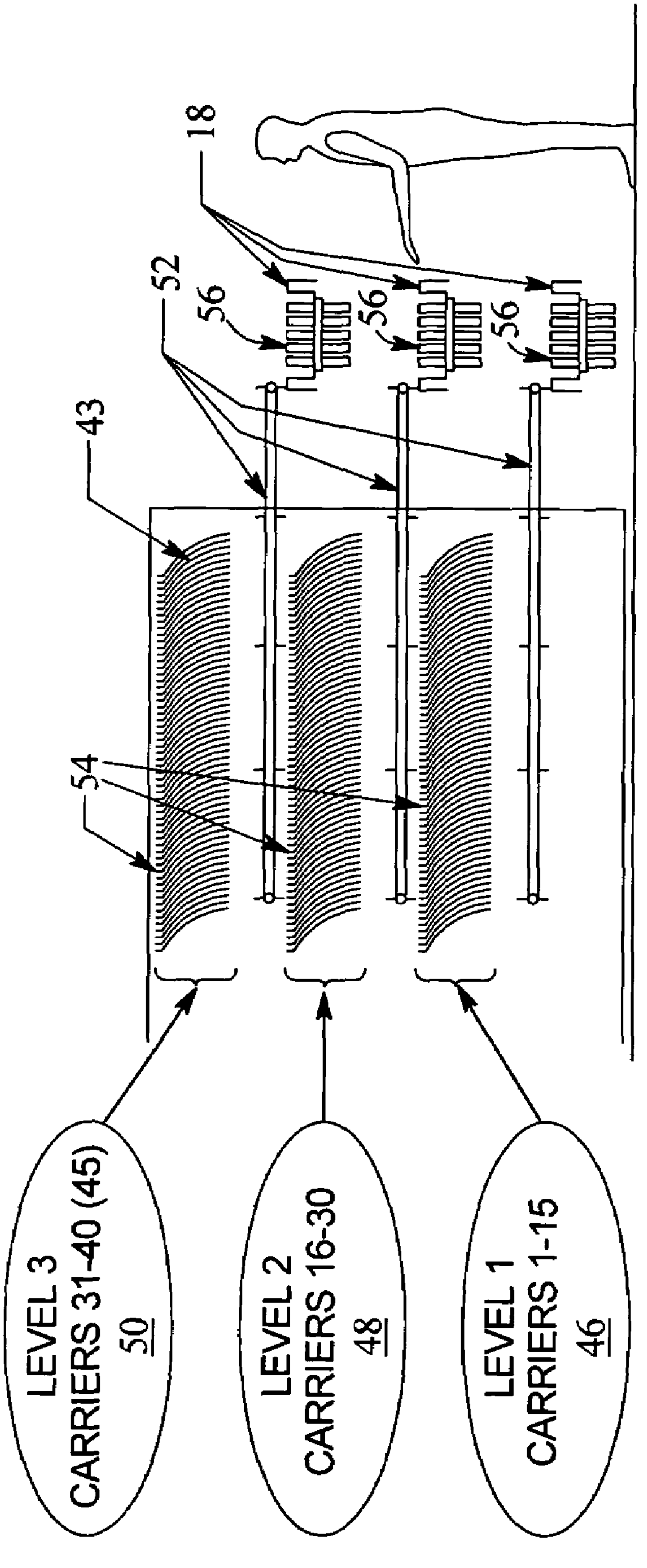
FIG. 3 illustrates a side elevation view of a portion of a processing line and main delivery point conveyors used in the system shown in FIG. 1.

Each Level of bins 43 can be assigned a range of identifiers (discussed below) such as delivery points or carrier routes, but the bins 43 are not assigned to a identifier or delivery point. As shown in FIG. 3, Level One bins 46 may be assigned to carriers 1-15, Level Two bins 48 may be assigned to carriers 16-30 and Level Three bins 50 may be assigned to carriers 31-40. Each row of bins has a processing line delivery point conveyor 52 positioned below it. The processing line delivery point conveyors 52 for each processing line 16 connect at approximately right angles to one of three main delivery point conveyors 18. The three main delivery point conveyors 18 are positioned at three levels as well. A residual mail feeder 20 specifically designed for residual mail is connected to each of the main delivery point conveyors 18. An automatic packaging system 22 and traying system 24 are also located at the end of each of the main delivery point conveyors 18.

In operation, machine operators manually load mail pieces from the supply conveyor 14 into infeed magazines in the feeders 30. Letters are singulated and fed by the feeder 30 into the processing line 16 in vertical, landscape orientation, with the bound edge leading. Flats are singulated and fed into the processing lines 16 in vertical high-aspect orientation. Mail pieces are first transported through the image lift module 32 where images can be captured for barcode reading ("BCR"), optical character reading ("OCR"), local video encoding ("LVE") and/or remote video encoding ("RVE"). Mail pieces are then transported through a delay module 34 that provides enough delay time for BCR, OCR, LVE and/or RVE processing to be performed so a sort decision can be made about the mail piece before it reaches the next module, e.g. the diverter 36. All information captured by the image lift module 32 can be stored in a computer (not shown). Based on the captured information, the computer creates an electronic ID for each mail piece. The electronic ID includes information relating to the position of the mail piece within the system and other identifiers or characteristics for the mail piece. The identifiers may be unique identifiers for each mail piece, such as a delivery point result, 3- or 5-digit zip code information, a 11 digit unique identifier, PLANET code information, other 2-dimensional codes, Rf signal, etc. The computer also controls the path of each mail piece within the system 10, so that the location and characteristics relating to each mail piece is known at all times.

Based on the identification information captured at the image lift module 32, mail pieces are then either diverted to the right side of the processing line 16, left side of the processing line 16 or to a reject bin (not shown) by the diverter module 36. Mail pieces diverted to a processing line 16 are then transported to the laydown module 38 where they are rotated from vertical to horizontal orientation. Next, mail pieces pass through the elevator module 40 to the proper mail piece transport 54 level, i.e., Level One 46, Level Two 48 or Level Three 50, as directed by the computer based upon the characteristics of the mail piece. Mail pieces are then transported along the processing line 16 horizontally and are diverted from the horizontal belt and roller mail piece transport 54 into one of the single-mail piece bins 43, again as controlled by the computer and based upon the identification characteristics of the mail piece captured by the image lift module 32. The location of the mailpiece is stored by the computer in the electronic ID.

In tracking the location of the mail pieces through the system 10, the computer receives signals from a variety of sources. These sources include photo cells, limit switches and proximity sensors, that can be located on or in various modules thought the system 10, and all of which generate signals that are sent to the computer. Using these signals, the computer can maintain accurate tracking information about each mail piece within the system 10 and update the electronic ID for each mail piece as appropriate. The computer can then generate signals to a variety of output arrays and devices, including motors and solenoids, to control the location and sequencing of mail piece sorting.

Once the system 10 has been loaded with all of the mail to be delivered to a particular location, e.g., such as a U.S.P.S. Associate Office for a particular day, the system 10 can begin the process of putting the mail in a desired sequence or order, such as delivery point order. Mail pieces may be dropped from the bins 43 onto the processing line delivery point conveyor 52 in a particular order based on the identifier, e.g., by a delivery point order, as directed by the computer. The processing line delivery point conveyors 52 may run the length of the processing lines 16 and transport mail pieces all the way to the main delivery point conveyors 18 at the end of the processing line delivery point conveyors 52. All of the mail pieces destined for a particular delivery point may be collected into a single pocket 56 on one of the main delivery point conveyors 18. The pockets 56 may be indexed or moved back and forth along the main delivery point conveyors 18 as needed to pick up the mail pieces in a delivery point order. The movement of the pockets 56 is also controlled by the computer system and software (discussed below) based on signals from the computer.

After all of the mail pieces for a particular delivery point are gathered from the bins 43 and placed into a stack on a pocket 56, residual mail may then placed on top of all or some of the delivery point mail stacks as they pass by the residual mail feeders 20. At the end of each main delivery point conveyor 18, delivery point mail stacks may be transferred to an automatic packaging system 22. After delivery point mail stacks have been packaged, they may then automatically be placed into mail trays.

Features of the system 10 include: flats and letters are processed separately on separate processing lines, i.e., letter processing lines 26 or flats processing lines 28, until the final sequencing and collation process, which allows the processing rate for letters to be as great as possible. Difficult flats can be processed on a separate line 28, which will optimize the entire throughput of the system 10. For example, the mail piece transports 54 shown in FIG. 2*a* may run at speeds of approximately 150 inches per second for letter size mail pieces, the mail piece transports 54 shown in FIG. 2*b* may be run at speeds of approximately 45 inches per second for flats and the mail piece transports 54 shown in FIG. 2*c* may be run at approximately 20 inches per second to accommodate larger and thicker flat mail pieces.

Individual processing lines can also be customized to suit particular mail types and characteristics. Mail pieces can also be merged to a collation unit similar to one used with conventional mail inserting equipment.

Use of individual bins 43, reduces the risk of a mail piece colliding with another mail piece as it enters a bin 43 because only one mail piece is inserted into a bin 43. The system 10 is able to continue operating even if any of the individual bins 43 or an entire row of bins 43 are disabled, as the computer can simply prevent mail pieces from being placed into a disabled bin.

It is also possible to overlap the processing of various destinations, e.g., multiple U.S.P.S. Associate Offices, which results in increased throughput. The system 10 can also be used to preprocess mail for other P&DC's.

The system 10 is volume efficient, which means: it is possible to operate a portion of the overall system 10 when mail volumes are low; there is potential to realize a significant reduction in power consumption; there is potential for a significant reduction in the number of operators required.

Due to the fact that the packaging equipment 22 is positioned after the end of the processing lines 16, the system 10 allows the option of wrapping, banding or bagging the delivery point bundles. This configuration also allows the delivery point bundles to not be packaged, if necessary for future upstream processing.

Figure 4:
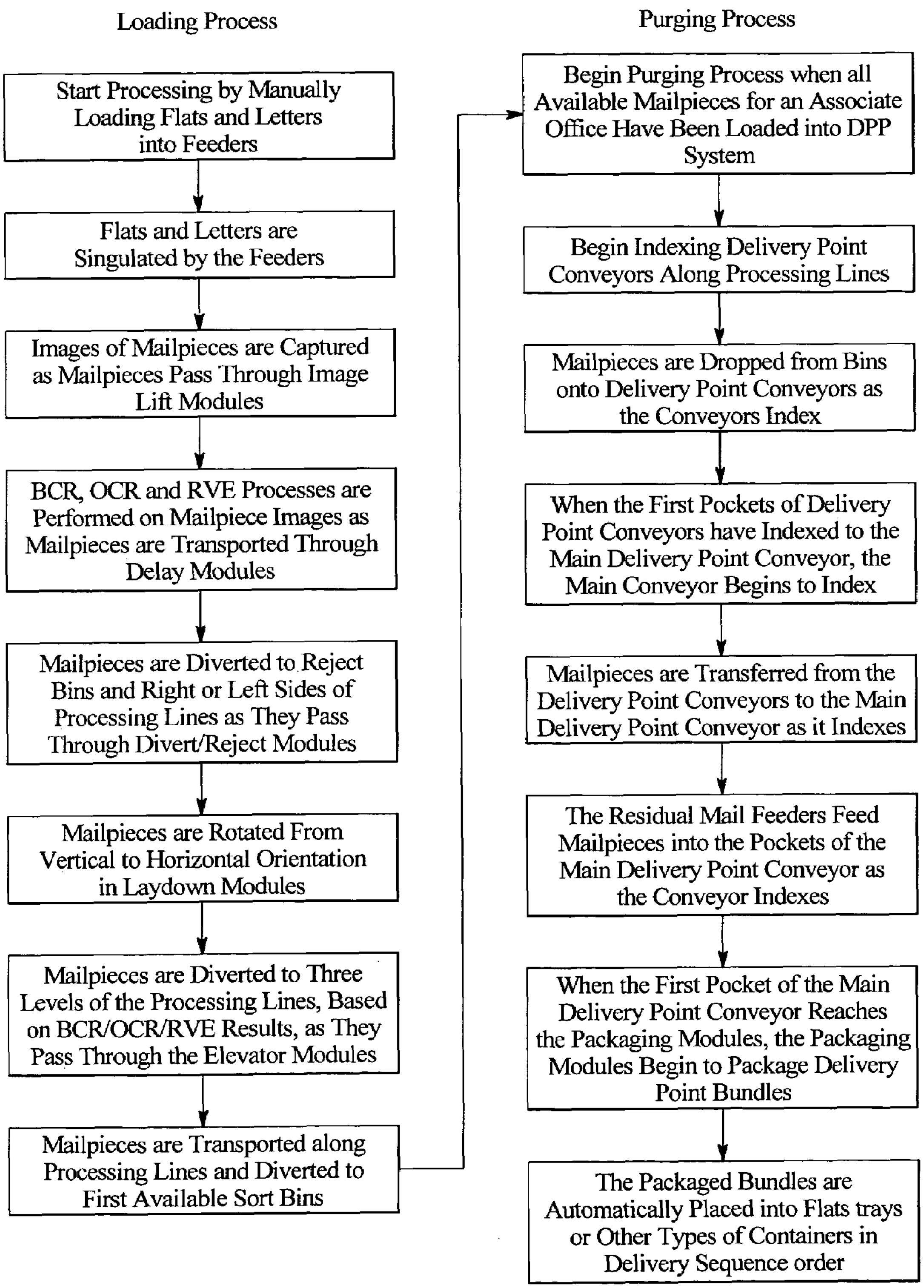
FIG. 4. illustrates a flow chart of a process to sort mail pieces in the system shown in FIG. 1.

An operational flow chart showing the steps followed to process mail in such a system 10 is shown in FIG. 4. As noted above, the processing system 10 includes a computer system (not shown) which runs software that controls the sort logic and flow of the mail pieces within the system 10. The program stores information about certain characteristics of each mail piece and/or information printed on each mail piece as well as the location of each mail piece at all times within the system.

For example, the computer may store information generated from the BCR, OCR, LVE or RVE. The computer may also track the location of each mail piece at all times as it travels through the system 10. The computer sends signals to and receives signals from various controllers associated with many parts of the systems, e.g., bin diverter gates 44, divert/reject module 36, elevator module 40, as is apparent to one of ordinary skill in the art. As shown in the flow chart of FIG. 4, the processing system generally has two phases, a loading processing phase and a purging processing phase. Generally, in the loading processing phase, the mail pieces are loaded into the bins 43, with the location of each mail piece being tracked. In the purging processing phase, the mail pieces are purged from the bins 43, in a predetermined order based on the identification information stored in each electronic ID, such as delivery point information and assembled into packages for delivery.

Figure 5:
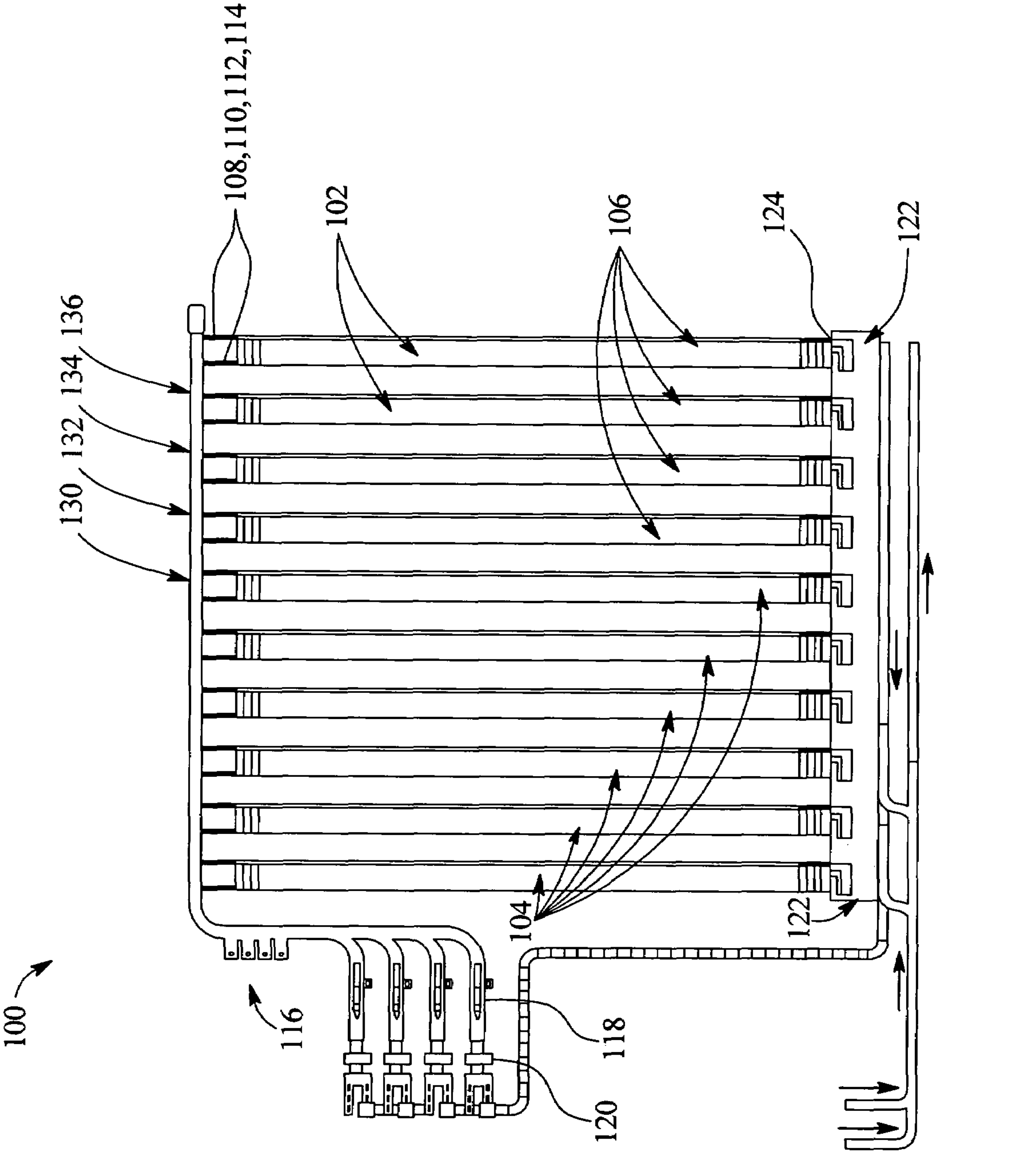
FIG. 5 illustrates a schematic diagram of another example of a delivery point sorting system.

Another example of a delivery point packaging system is shown in FIG. 5. This system 100 also uses separate processing lines 102 for letters 104 and flats 106. The letters processing lines 102 use feeders and transports that are specifically designed for feeding letters, while the flats processing lines 106 use feeders and transports that are specifically designed for feeding flats.

The overall system 100 includes the following subsystems: letters processing lines 104 and flats processing lines 106, four main delivery point conveyors 108, 110, 112, 114, residual mail feeders 116 for saturation type mail, automatic packaging modules 118 and traying systems 120.

Each processing line 104 or 106 includes the following subsystems: feeder 122, image lift module 124, multiple processing modules or bin modules 126 or 128, four main delivery point conveyors 130, 132, 134, 136.

Figure 6B:
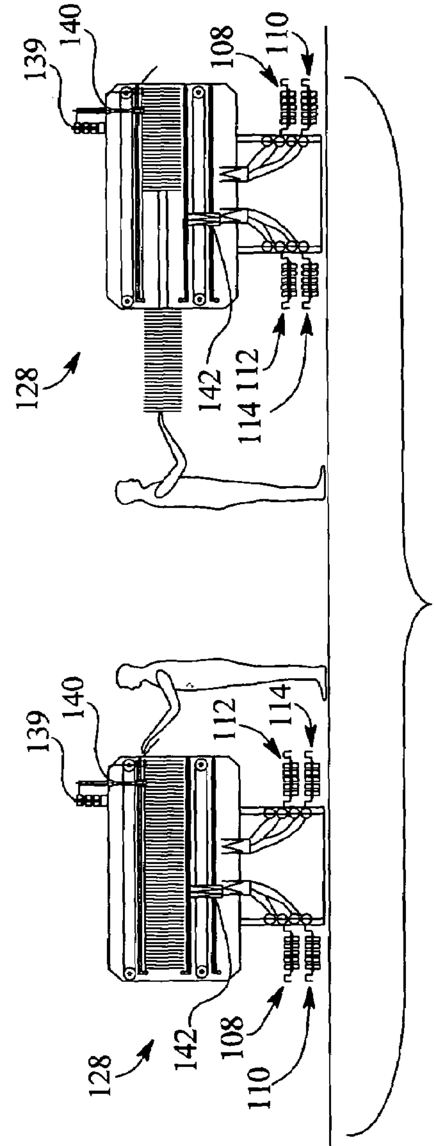
FIG. 6 illustrates cross-sectional side views of various bin modules used in the system shown in FIG. 5.
Figure 6A:
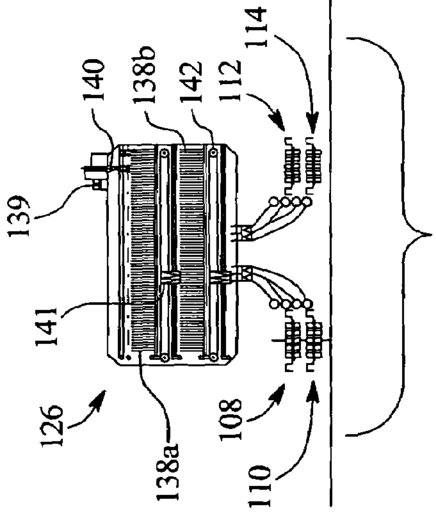
Figure 8:
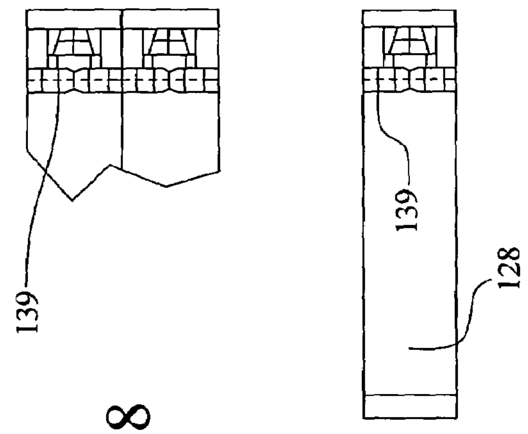
FIG. 8 illustrates a top view of a bin module shown in FIG. 6.

As shown in FIG. 6, the letter bin modules 126 have two levels of bins 138 (upper bins 138A and pass-through bins 138B, with a middle transport bin 141 in between) (See FIG. 6*a*), while the flats bin modules 128 have a single level of bins 138 (see FIG. 6*b*). Each bin 138 holds a single mail piece. The bins 138 are not assigned to any particular carrier routes or delivery points. A belt and roller transport 139 is positioned above each of the bin modules 126 and/or 128 and runs the length of the processing line 102. Each bin module 126 and/or 128 includes a portion of the belt and roller transport and diverter mechanism (see FIG. 8).

Figure 7:
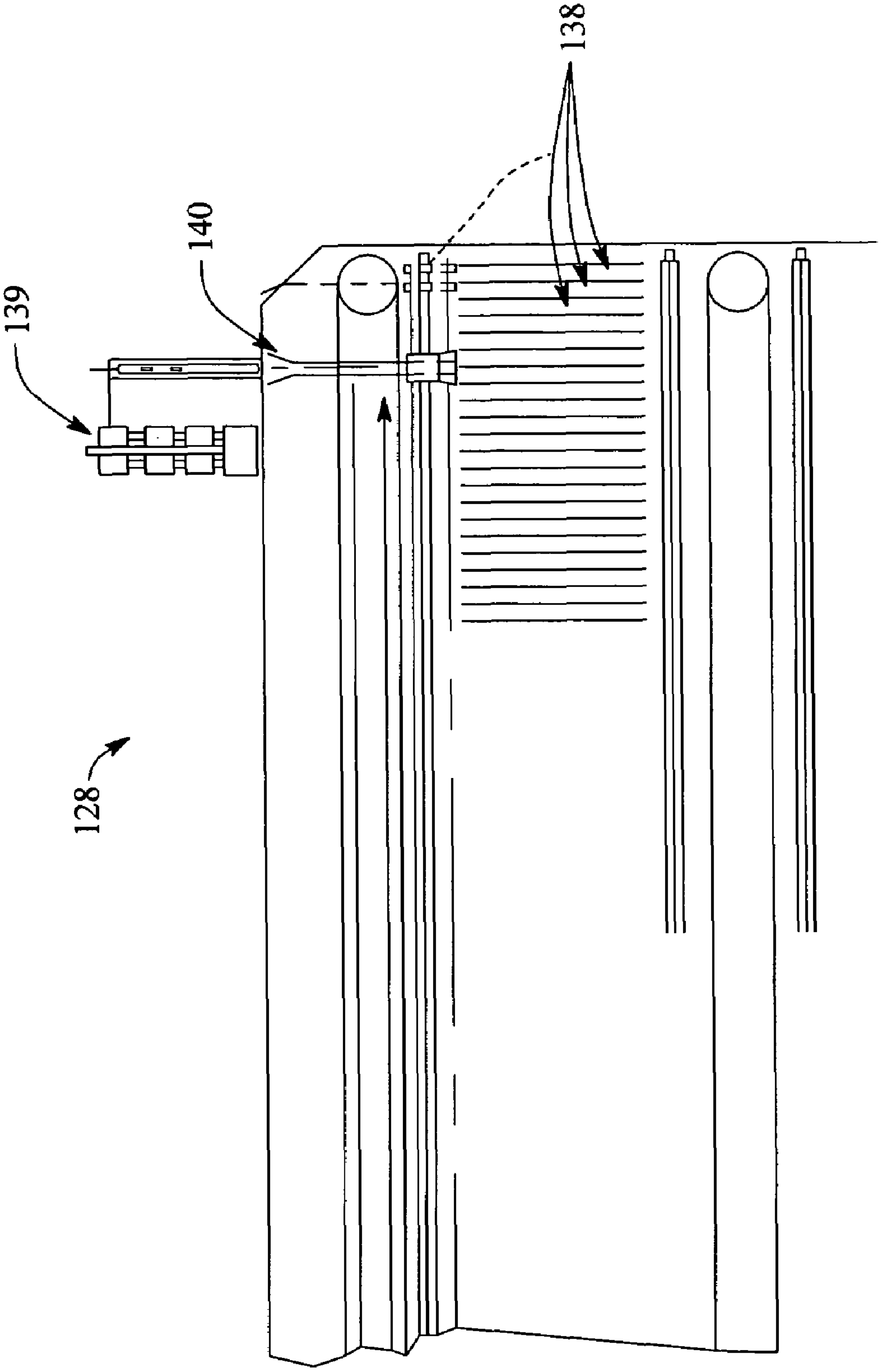
FIG. 7 illustrates a more detailed cross-sectional side view of a portion of one of the bin modules shown in FIG. 6.

Each bin module 126 and/or 128 includes an upper shuttle bin 140 that receives a mail piece from the belt and roller transport 139 and transfers mail pieces to the bins 138. The upper shuttle bin 140 moves along the bin module 128 as shown by the arrows of FIG. 7. Each bin module 126 and/or 128 includes a lower shuttle bin 142 that transfers mail pieces from the bins 138 to one of the delivery point conveyors 108, 110, 112, 114. The lower shuttle bin 142 and the middle shuttle bin 141 also index or move along the bin module 128 similar to the upper shuttle bin 140. Each bin 138 and shuttle bin 140, 141, 142, includes a gate at the bottom that opens to allow the mail piece to drop into the next lower bin or to the delivery point conveyor. The four delivery point conveyors 108, 110, 112, 114 are positioned below the bin magazine modules 126 and/or 128 and run the length of the processing line 102. The delivery point conveyors 108, 110, 112, 114 for each processing line 102 connect at approximately right angles to the four main delivery point conveyors 130, 132, 134 and 136. The four main conveyors 130, 132, 134 and 136 are positioned at four levels. The residual mail feeder 116 is specifically designed for residual mail and is connected to each of the main delivery point conveyors 130, 132, 134 and 136. The automatic packaging system 118 and the traying system 120 are located at the end of each of the main delivery point conveyors 130, 132, 134, 136.

Machine operators manually load mail pieces into infeed magazines of the feeders 122. Letters and flats are singulated and fed into the processing lines 104 or 106 in vertical landscape orientation. Mail pieces are first transported through the image lift module 124 where images are captured for BCR, OCR, LVE and/or RVE processing. Information captured or gathered about each mailpiece by the image lift module 124 is stored in a computer (not shown) similar to the computer described above with reference to the example in FIG. 1. An electronic ID is also similarly generated for each mail piece. Mail pieces are then transported along a transport 139 the top of the bin modules 126 or 128 until they are diverted to a particular bin module 126 or 128 as directed by the computer based upon identification information captured at the image lift module 124. Once a mail piece has been diverted to a particular bin module 126 or 128, the mail piece drops into the upper shuttle bin 140. The upper shuttle bin 140 then transfers the mail piece to the next available bin 138 as also directed by the computer.

Once the system has been loaded with all of the mail to be delivered to a particular location, e.g., an Associate Office for a particular day, the system begins the process of putting the mail in a sequence order based on the identification information, e.g., based on delivery point information. Each mail piece is dropped from a bin 138 into the lower shuttle bin 142, which then transfers the mail piece to one of four delivery point conveyors 108, 110, 112, 114. Mail pieces are dropped from the bins 138 onto the delivery point conveyor 108, 110, 112 and 114 in, for example, delivery point sequence order. The delivery point conveyors 108, 110, 112 and 114 that run the length of the processing lines 102 transport mail pieces to the main delivery point conveyors 130, 132, 134 and 136. All of the mail pieces destined for a particular delivery point are collected and delivered to a single pocket (not shown) which can move along or index along the main delivery point conveyor 130, 132, 134 or 136. After all mailpieces for a particular delivery point are collected from the bins and stacked on a main delivery point conveyor, the stack can be passed to the residual mail feeders 116. Residual mail is placed on top of the delivery point mail stacks as they pass by the residual mail feeders 116. At the end of each delivery point conveyor, delivery point mail stacks can be transferred to an automatic packaging system 118. After delivery point mail stacks have been packaged, they can then be automatically placed into mail trays in the traying system 120.

The system 100 does not require a separate delay section or buffer for OCR/RVE processing. The latency time for OCR processing is automatically accommodated by the system.

Flats and letters are processed separately until the final sequencing and collation process, which allows the processing rate for letters to be as great as possible.

Individual processing lines 104 and 106 can be customized to suit particular mail types and characteristics.

There is no risk of a mail piece colliding with another mail piece as it enters a bin 138 because only one mail piece is inserted into a bin 138. The system 100 is also able to continue operating even if individual bins, a bin module or an entire row of bins are disabled.

It is possible to overlap the processing of multiple Associate Offices, which will result in increased throughput.

The system 100 is volume efficient, which means: it is possible to operate a portion of the overall system 100 when mail volumes are low; there is potential to realize a significant reduction in power consumption; there is potential for a significant reduction in the number of operators required.

Due to the fact that the packaging equipment 118, 120 is positioned after the end of the processing line 102, the system 100 allows the option of wrapping, banding or bagging the delivery point bundles. This configuration also allows the delivery point bundles to not be packaged, if necessary.

The system 100 uses vertical module transports 139 (similar to a USPS machine known as an automatic flats sorting machine or AFSM 100) to move and divert mail pieces vertically rather than horizontally as in the previous example shown in FIG. 1.

Figure 9:
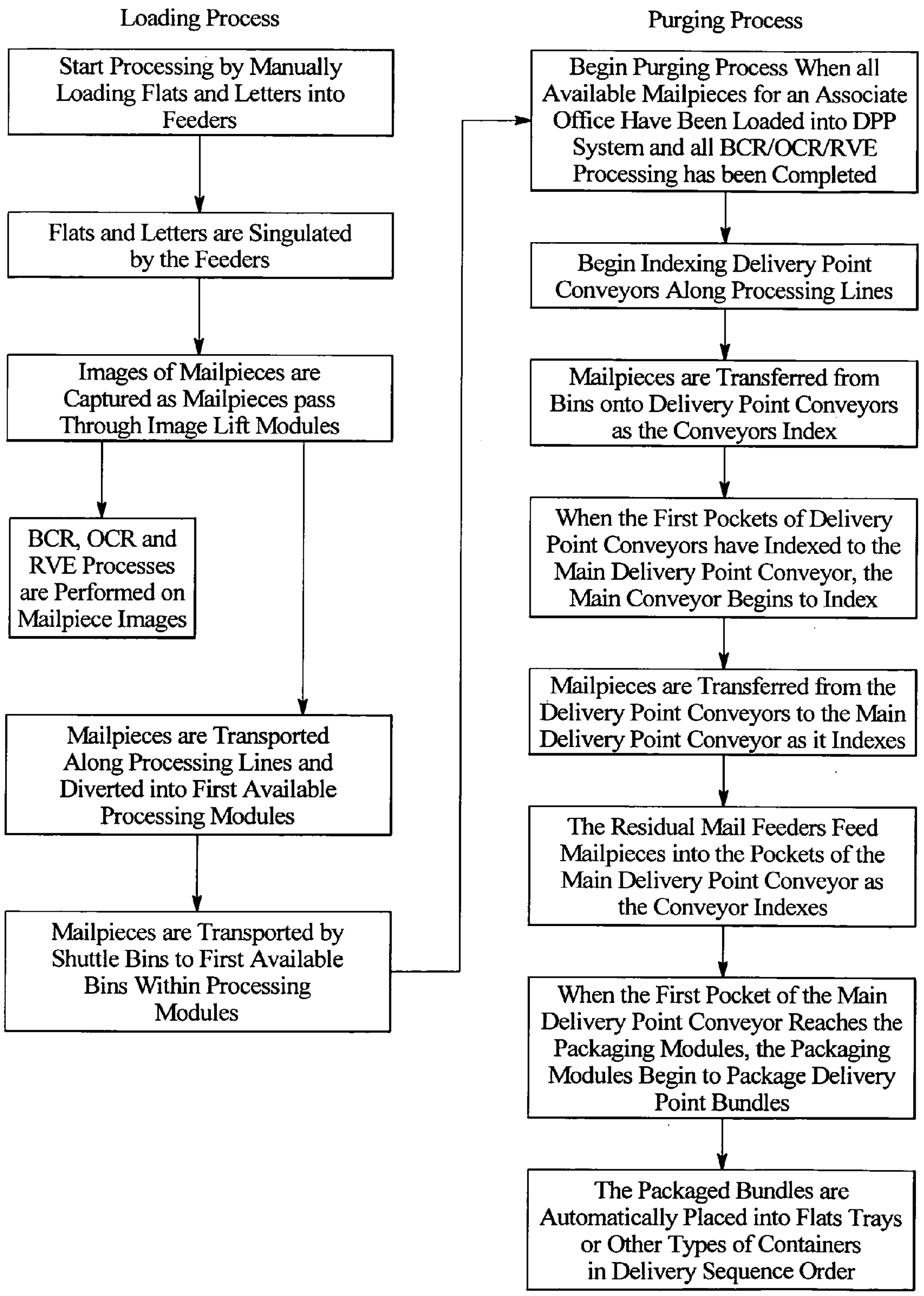
FIG. 9. illustrates a flow chart of a process used to sort mail pieces in the system shown in FIG. 5.

An operational flow chart showing the steps followed to process mail in such a system 100 is shown in FIG. 9. As noted above, the processing system 100 includes a computer system (not shown) similar to the one described above with reference to FIG. 1 and which runs software that controls the sort logic and flow of the mail pieces within the system 100. The program stores information about certain characteristics of each mail piece and/or information printed on each mail piece as well as the location of each mail piece at all times within the system. For example, the computer may store information generated from the BCR, OCR, LVE or RVE. The computer may also track the location of each mail piece at all times as it travels through the system 100. The computer sends signals to and receives signals from various controllers associated with many parts of the systems, e.g., shuttle bins 140, bins 138, transport and diverter 139, etc., as is apparent to one of ordinary skill in the art. As shown in the flow chart of FIG. 9, the processing system generally has two phases, a loading processing phase and a purging processing phase. Generally, in the loading processing phase, the mail pieces are loaded into the bin modules 124, with the location of each mail piece being tracked. In the purging processing phase, the mail pieces are purged from the bin modules 124, in a predetermined order based on the identification information stored in each electronic ID, such as delivery point information and assembled into packages for delivery.

As shown by the above discussion, many of the functions relating to the delivery point sorting systems 10 and 100 are implemented on a computer or computers, which of course may be connected for data communication via components of a network. The hardware of such computer platforms typically is general purpose in nature, albeit with an appropriate network connection for communication via the intranet, the Internet and/or other data networks.

As known in the data processing and communications arts, each such general-purpose computer typically comprises a central processor, an internal communication bus, various types of memory (RAM, ROM, EEPROM, cache memory, etc.), disk drives or other code and data storage systems, and one or more network interface cards or ports for communication purposes. The computer system also may be coupled to a display and one or more user input devices (not shown) such as alphanumeric and other keys of a keyboard, a mouse, a trackball, etc. The display and user input element(s) together form a service-related user interface, for interactive control of the operation of the computer system. These user interface elements may be locally coupled to the computer system, for example in a workstation configuration, or the user interface elements may be remote from the computer and communicate therewith via a network. The elements of such a general-purpose computer system also may be combined with or built into routing elements or nodes of the network.

The software functionalities (e.g., many of the steps shown in the flow charts of FIGS. 4 and 9) involve programming of controllers, including executable code as well as associated stored data. The software code is executable by the general-purpose computer that functions as the particular computer. In operation, the executable program code and possibly the associated data are stored within the general-purpose computer platform. At other times, however, the software may be stored at other locations and/or transported for loading into the appropriate general-purpose computer system. Hence, the embodiments involve one or more software products in the form of one or more modules of code carried by at least one machine-readable medium. Execution of such code by a processor of the computer platform enables the platform to implement the delivery point sorting system 10 or 100 functions, in essentially the manner performed in the embodiments discussed and illustrated herein.

As used herein, terms such as computer or machine readable medium refer to any medium that participates in providing instructions to a processor for execution. Such a medium may take many forms, including but not limited to, non-volatile media, volatile media, and transmission media. Non-volatile media include, for example, optical or magnetic disks, such as any of the storage devices in any computer(s). Volatile media include dynamic memory, such as main memory of such a computer platform. Physical transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include, for example: a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the technology disclosed herein may be implemented in various forms and examples, and that they may be applied in numerous applications, only some of which have been described herein. It is intended by the following claims to claim any and all modifications and variations that fall within the true scope of the advantageous concepts disclosed herein.

The invention claimed is:

1. A delivery point sorting system for sorting mail pieces including delivery point identifiers comprising:

a plurality of mail accumulator processing lines, including at least one processing line designated and configured for processing of letters at a first speed and at least one processing line designated for processing of flats at a second speed slower than the first speed;

a mail piece extraction system; and a controller that controls said mail accumulator processing lines to accept the mail pieces and divert each of the mail pieces to a corresponding single mail piece location unit selected without regard to delivery point, said controller further controls said mail extraction system to extract the mail pieces from said single mail piece location units such that each of the mail pieces to be delivered to a common delivery point are extracted, in a single pass, to a bundle, wherein at least one single mail piece location unit has a first width configured to accommodate letters, and at least one single mail location unit has a second width configured to accommodate flats, wherein the first width is smaller than the second width.

2. The delivery point sorting system of claim 1 wherein said plurality of mail accumulator processing lines further includes at least one processing line for processing of large and thick flats.

3. The delivery point sorting system of claim 1 wherein said plurality of mail accumulator processing lines includes an image lift module that reads the delivery point identifiers on the mail pieces.

4. The delivery point sorting system of claim 3 wherein said delivery point identifier is a printed address.

5. The delivery point sorting system of claim 3 wherein said delivery point identifier is a barcode.

6. The delivery point sorting system of claim 1 wherein said single mail piece location units are bins in bin modules.

7. The delivery point sorting system of claim 1 wherein said mail piece extraction system includes a processing line delivery point conveyor associated with each of said plurality of independent mail processing lines.

8. The delivery point sorting system of claim 7 wherein said mail piece extraction system further includes a main delivery point conveyor system associated with said processing line delivery point conveyors.

9. The delivery point sorting system of claim 1 further including a saturation mail feeder for processing mail pieces without delivery point identifiers.

10. A system for sorting and tracking of a plurality of mail pieces, the system comprising:

a plurality of mail processing lines, including at least one processing line designated and configured for processing of letters at a first speed and at least one processing line designated for processing of flats at a second speed slower than the first speed;

a mail piece extraction system; and a controller that stores information associated with each mail piece and also stores the location of each mail piece, the controller being associated with the mail processing lines and the mail piece extraction system, wherein the controller controls the mail processing lines to receive the mail pieces and read the mail pieces and routes each of the mail pieces to a corresponding storage location without regard to delivery point such that no more than one mail piece is stored in each location at any point in time, further wherein the controller controls the mail piece extraction system to extract the mail pieces from the storage locations in an order determined by information provided by the controller such that the mail pieces are sorted within bundles and the bundles are sorted in sequential delivery order with respect each other, wherein at least one storage location has a first width configured to accommodate letters, and at least one storage location has a second width configured to accommodate flats, wherein the first width is smaller than the second width.

11. The system of claim 10 wherein the information is a delivery point identifier.

12. The system of claim 11 wherein the mail extraction system extracts the mail pieces into groups to be delivered to a common delivery point.

13. A delivery point sorting system for sorting mail pieces based on delivery point identifiers associated with the mail pieces, the system comprising:

a plurality of mail accumulator processing lines, including at least one processing line designated and configured for processing of letters at a first speed and at least one processing line designated for processing of flats at a second speed slower than the first speed;

a mail piece extraction system; and a controller associated with the mail accumulator processing lines and the mail piece extraction system, wherein the controller controls the mail accumulator processing lines to accept the mail pieces and rout the mail pieces to respective ones of single mail piece storage units without regard to delivery point, further wherein the controller controls the mail piece extraction system to extract a plurality of individual mail pieces having one of the associated delivery point identifiers in common from a plurality of the single mail piece storage units to one or more conveyors positioned to move past outputs of the single mail piece storage units so as to accumulate the extracted mail pieces into bundles, all of the mail pieces accumulated in a bundle being intended for delivery to a common delivery point corresponding to the common delivery point identifier such that the bundles are sorted in sequential delivery order with respect each other, wherein at least one single mail piece storage unit has a first width configured to accommodate letters, and at least one single mail piece storage unit has a second width configured to accommodate flats, wherein the first width is smaller than the second width.

14. The system of claim 13 wherein the delivery point identifiers on each of the mail pieces are read by an image lift module.

15. The system of claim 13 wherein each of the single mail piece storage units is customized for either letters or flats.

16. The system of claim 13 wherein each of said single mail piece storage units is a bin in a bin module.

17. The system of claim 13 wherein the mail pieces are extracted from the single mail piece storage locations by a plurality of processing line delivery point conveyors.

18. The system of claim 17 wherein the plurality of processing line delivery point conveyors feed the mail pieces to a main delivery point conveyor system.

19. The system of claim 13 wherein the controller tracks each mail piece whose delivery point identifier cannot be determined prior to being stored in its corresponding single mail piece location unit such that when each delivery point identifier is determined it can be associated with the corresponding mail piece.

* * * * *